US012498509B2

(12) United States Patent
Chen et al.

(10) Patent No.: US 12,498,509 B2
(45) Date of Patent: Dec. 16, 2025

(54) RETRO-REFLECTIVE DISC TARGET HAVING EXPOSED RETRO-REFLECTIVE BEADS

(71) Applicant: Northern Digital Inc., Waterloo (CA)

(72) Inventors: Larry Chen, Fergus (CA); David Willms, Waterloo (CA); Athanasios Tommy Balkos, Waterloo (CA); Shaulaine White, Cambridge (CA)

(73) Assignee: Northern Digital Inc., Waterloo (CA)

( * ) Notice: Subject to any disclaimer, the term of this patent is extended or adjusted under 35 U.S.C. 154(b) by 632 days.

(21) Appl. No.: 17/848,440

(22) Filed: Jun. 24, 2022

(65) Prior Publication Data

US 2022/0413196 A1    Dec. 29, 2022

Related U.S. Application Data

(60) Provisional application No. 63/214,533, filed on Jun. 24, 2021.

(51) Int. Cl.
| | |
|---|---|
| *A61B 6/00* | (2024.01) |
| *A61B 34/20* | (2016.01) |
| *A61B 90/00* | (2016.01) |
| *G01S 17/06* | (2006.01) |
| *G01S 17/66* | (2006.01) |
| *G02B 1/11* | (2015.01) |
| *G02B 5/00* | (2006.01) |
| *G02B 5/08* | (2006.01) |
| *G02B 5/12* | (2006.01) |
| *G02B 5/128* | (2006.01) |
| *G02B 5/20* | (2006.01) |
| *G02B 7/00* | (2021.01) |

(Continued)

(52) U.S. Cl.
CPC .............. *G02B 5/208* (2013.01); *G01S 17/66* (2013.01); *G02B 5/12* (2013.01); *G02B 27/32* (2013.01); *A61B 6/547* (2013.01); *A61B 2090/3979* (2016.02); *A61B 2090/3983* (2016.02); *A61B 2217/002* (2013.01); *G02B 5/128* (2013.01); *G02B 7/006* (2013.01)

(58) Field of Classification Search
CPC . A61B 6/547; A61B 90/39; A61B 2034/2055; A61B 2090/3937; A61B 2090/397; A61B 2090/3979; A61B 2090/3983; A61B 2217/002; G01S 17/06; G01S 17/66; G02B 1/11–118; G02B 5/003; G02B 5/0808; G02B 5/12; G02B 5/208; G02B 27/32; G06F 3/0325
See application file for complete search history.

(56) References Cited

U.S. PATENT DOCUMENTS

| | | | |
|---|---|---|---|
| 5,073,005 A | 12/1991 | Hubbs | |
| 5,189,554 A * | 2/1993 | Vanasse | G02B 27/0994 359/530 |

(Continued)

FOREIGN PATENT DOCUMENTS

| | | |
|---|---|---|
| CN | 114667468 A | 6/2022 |
| DE | 102016217628 | 3/2018 |

(Continued)

*Primary Examiner* — Ryan S Dunning
(74) *Attorney, Agent, or Firm* — Fish & Richardson P.C.

(57) ABSTRACT

A retro-reflective marker comprising a bare retro-reflective layer; a protective layer with a near-infrared (NIR) wavelength specific anti-reflective coating; and a border with an NIR absorbent coating.

27 Claims, 5 Drawing Sheets

(51) Int. Cl.
*G02B 27/32* (2006.01)
*G06F 3/03* (2006.01)

(56) References Cited

U.S. PATENT DOCUMENTS

| | | | |
|---|---|---|---|
| 6,120,280 A * | 9/2000 | Mimura | B29D 11/00625 |
| | | | 425/DIG. 30 |
| 6,402,762 B2 | 6/2002 | Hunter et al. | |
| 7,289,227 B2 | 10/2007 | Smetak et al. | |
| 7,313,430 B2 | 12/2007 | Urquhart et al. | |
| 7,444,178 B2 | 10/2008 | Goldbach | |
| 7,599,730 B2 | 10/2009 | Hunter et al. | |
| 7,660,623 B2 | 2/2010 | Hunter et al. | |
| 7,697,972 B2 | 4/2010 | Verard et al. | |
| 7,698,826 B2 | 4/2010 | Hubbs | |
| 7,726,564 B2 | 6/2010 | Goldbach | |
| 7,774,044 B2 | 8/2010 | Sauer et al. | |
| 7,925,328 B2 | 4/2011 | Urquhart | |
| 8,060,185 B2 | 11/2011 | Hunter et al. | |
| RE43,328 E | 4/2012 | Foley et al. | |
| 8,208,988 B2 | 6/2012 | Jensen | |
| 8,219,179 B2 | 7/2012 | Ganatra et al. | |
| 8,295,909 B2 | 10/2012 | Goldbach | |
| 8,320,612 B2 | 11/2012 | Knobel et al. | |
| 8,363,259 B2 | 1/2013 | Gilboa | |
| 8,382,759 B2 | 2/2013 | Tuma et al. | |
| 8,390,291 B2 | 3/2013 | Macfarlane et al. | |
| 8,467,853 B2 | 6/2013 | Hunter et al. | |
| 8,494,613 B2 | 7/2013 | Markowitz et al. | |
| 8,611,983 B2 | 12/2013 | Glossop | |
| 8,885,177 B2 | 11/2014 | Ben-Yishai et al. | |
| 9,179,984 B2 | 11/2015 | Teichiman et al. | |
| 9,561,387 B2 | 2/2017 | Yan et al. | |
| 9,613,421 B2 | 4/2017 | Wittmeier | |
| 9,668,768 B2 | 6/2017 | Piron et al. | |
| 9,668,819 B2 | 6/2017 | Stolka et al. | |
| 9,671,532 B1 | 6/2017 | Nolan et al. | |
| 9,675,246 B2 | 6/2017 | Goldbain et al. | |
| 9,681,925 B2 | 6/2017 | Azar et al. | |
| 9,687,307 B2 | 6/2017 | Wu | |
| 9,717,461 B2 | 8/2017 | Yu et al. | |
| 9,733,336 B2 | 8/2017 | Shen et al. | |
| 9,737,370 B2 | 8/2017 | Kheradpir et al. | |
| 9,779,502 B1 | 10/2017 | Lovverg et al. | |
| 9,808,321 B2 | 11/2017 | Huldin et al. | |
| 9,827,054 B2 | 11/2017 | Richmond et al. | |
| 9,841,811 B2 | 12/2017 | Reiner | |
| 9,844,360 B2 | 12/2017 | Stolka et al. | |
| 9,861,271 B2 | 1/2018 | Liu et al. | |
| 9,925,013 B2 | 3/2018 | Dell et al. | |
| 10,145,993 B1 | 12/2018 | Hadi et al. | |
| 10,157,310 B2 | 12/2018 | Vilsmeier et al. | |
| 10,166,078 B2 | 1/2019 | Sela et al. | |
| 10,405,930 B2 | 9/2019 | Richmond et al. | |
| 10,413,366 B2 | 9/2019 | Dyer et al. | |
| 10,433,763 B2 | 10/2019 | Piron et al. | |
| 10,537,393 B2 | 1/2020 | Huldin et al. | |
| 10,605,875 B2 | 3/2020 | Bailey | |
| 11,415,731 B2 * | 8/2022 | McCoy | G02B 5/128 |
| 2002/0168618 A1 | 11/2002 | Anderson et al. | |
| 2004/0152970 A1 | 8/2004 | Hunter et al. | |
| 2005/0084975 A1 | 4/2005 | Armentrout et al. | |
| 2005/0197569 A1 | 9/2005 | Msccombs | |
| 2005/0203380 A1 | 9/2005 | Sauer et al. | |
| 2005/0251030 A1 | 11/2005 | Azar et al. | |
| 2005/0261700 A1 | 11/2005 | Tuma et al. | |
| 2006/0072124 A1 | 4/2006 | Smetak et al. | |
| 2006/0082789 A1 | 4/2006 | Goldbach | |
| 2006/0241420 A1 | 10/2006 | Maier | |
| 2006/0293592 A1 | 12/2006 | Jensen | |
| 2007/0049819 A1 | 3/2007 | Stifer et al. | |
| 2007/0108978 A1 | 5/2007 | Macfarlane et al. | |
| 2007/0205373 A1 | 9/2007 | Kornblau et al. | |
| 2007/0299334 A1 | 12/2007 | Vilsmeier et al. | |
| 2008/0009713 A1 | 1/2008 | Tuma et al. | |
| 2008/0021311 A1 | 1/2008 | Goldbach | |
| 2008/0183065 A1 | 7/2008 | Goldbach | |
| 2008/0185430 A1 | 8/2008 | Goldbach | |
| 2009/0039886 A1 | 2/2009 | White | |
| 2009/0068620 A1 | 3/2009 | Knobel et al. | |
| 2010/0168556 A1 | 7/2010 | Shen et al. | |
| 2010/0232666 A1 | 9/2010 | Urban et al. | |
| 2011/0181893 A1 | 7/2011 | Macfarlane et al. | |
| 2011/0295110 A1 | 12/2011 | Manzke et al. | |
| 2012/0143049 A1 | 6/2012 | Neubauer et al. | |
| 2012/0302878 A1 | 11/2012 | Lie et al. | |
| 2012/0323255 A1 | 12/2012 | Kornblau et al. | |
| 2013/0245640 A1 | 9/2013 | Whitmore, III | |
| 2014/0078517 A1 | 3/2014 | Ben-Yishai et al. | |
| 2014/0096369 A1 | 4/2014 | Matsumoto et al. | |
| 2014/0247336 A1 | 9/2014 | Vilsmeier et al. | |
| 2014/0253712 A1 | 9/2014 | Vilsmeier et al. | |
| 2014/0324061 A1 | 10/2014 | Gotte | |
| 2015/0038836 A1 | 2/2015 | Hiladio et al. | |
| 2015/0282735 A1 | 10/2015 | Rossner et al. | |
| 2015/0305650 A1 | 10/2015 | Hunter et al. | |
| 2015/0351860 A1 | 12/2015 | Piron et al. | |
| 2016/0157887 A1 | 6/2016 | Kim et al. | |
| 2016/0278875 A1 | 9/2016 | Crawford et al. | |
| 2016/0324583 A1 | 11/2016 | Kheradpir et al. | |
| 2017/0007334 A1 | 1/2017 | Crawford et al. | |
| 2017/0143429 A1 | 5/2017 | Richar | |
| 2017/0151027 A1 | 6/2017 | Walker et al. | |
| 2017/0165005 A1 | 6/2017 | Kheradpir et al. | |
| 2017/0202633 A1 | 7/2017 | Liu | |
| 2017/0251990 A1 | 9/2017 | Kheradpir et al. | |
| 2017/0258531 A1 | 9/2017 | Bodjankski | |
| 2017/0265947 A1 | 9/2017 | Dyer et al. | |
| 2018/0116746 A1 | 5/2018 | Lennertz et al. | |
| 2018/0120435 A1 | 5/2018 | Decker et al. | |
| 2018/0125586 A1 | 5/2018 | Sela et al. | |
| 2018/0235714 A1 | 8/2018 | Kuo et al. | |
| 2018/0250077 A1 | 9/2018 | Xu et al. | |
| 2018/0263707 A1 | 9/2018 | Sela et al. | |
| 2018/0289428 A1 | 10/2018 | Lee et al. | |
| 2019/0015162 A1 | 1/2019 | Abhari et al. | |
| 2019/0015163 A1 | 1/2019 | Abhari et al. | |
| 2019/0021797 A1 | 1/2019 | Dyer et al. | |
| 2019/0064290 A1 | 2/2019 | Bailey | |
| 2019/0080161 A1 | 3/2019 | Vilsmeier et al. | |
| 2019/0254757 A1 | 8/2019 | Piron et al. | |
| 2019/0279089 A1 | 9/2019 | Wang | |
| 2020/0264351 A1 | 8/2020 | McCoy et al. | |
| 2021/0247621 A1 * | 8/2021 | Yang | H04N 23/57 |
| 2022/0280247 A1 * | 9/2022 | Franitza | A61B 34/20 |
| 2022/0333995 A1 * | 10/2022 | Camargo | G01J 5/0853 |

FOREIGN PATENT DOCUMENTS

| | | |
|---|---|---|
| EP | 1492995 | 1/2005 |
| JP | 2005-253800 A | 9/2005 |
| KR | 20160069180 | 6/2016 |
| WO | WO 2003085356 | 10/2003 |

* cited by examiner

RETRO-REFLECTIVE DISC TARGET HAVING EXPOSED RETRO-REFLECTIVE BEADS

CLAIM OF PRIORITY

This application claims priority under 35 USC § 119(e) to U.S. Patent Application Ser. No. 63/214,533, filed on Jun. 24, 2021, the entire contents of which are hereby incorporated by reference.

TECHNICAL FIELD

This disclosure relates to retro-reflective disc targets, and in particular, retro-reflective disc targets for an optical tracking system.

BACKGROUND

Tracking systems (e.g., optical tracking systems) typically rely on objects having one or more markers affixed thereto. The markers that are affixed to an object may be active markers (e.g., light emitting diode markers), passive markers or a combination of active and passive markers. Generally, passive markers can be configured to reflect an optical signal toward a camera. The marker can be configured to reflect the optical signal on a parallel path back toward the signal source. In response to detection, by a camera, of an optical signal reflected from the marker, a tracking system can estimate a position of the marker in an environment.

SUMMARY

Described herein is a tracking system that is configured to determine a position of a tracked object in an environment by estimating the pose(s) (e.g., positions and orientations) of one or more markers affixed to the tracked object. At least one marker provides a signal to one or more sensors (e.g., cameras) of a tracking system. The signal indicates the position and orientation (e.g., pose) of the markers in the environment, from which the pose of the tracked object can be estimated. The tracking system can be an optical tracking system, and the markers can be passive retro-reflective markers configured to reflect an optical signal to the tracking object in a retro-reflective manner (e.g., such that optical signals are reflected back towards a source of the optical signal with minimum scattering). Generally, an optical sensor (e.g., a camera) is positioned near the source of the optical signal and configured to detect the reflected optical signal from the markers. A reflection (e.g., a glint) is detected on each of the markers. The tracking system is configured to estimate where the markers are in the environment based on where the reflected signal is detected. The pose of the tracked object is subsequently determined based on a predetermined relationship between the pose of each of the markers and the pose of the tracked object.

Traditional disc targets are generally made from encapsulated retro-reflective tape to achieve wipeability (e.g., which is necessary for repelling contaminants during surgery). These types of tapes, while highly resistant to contaminants, are not designed to maximize tracking accuracy. In general, two main sources of errors factor into traditional disc target design. One source is direct light reflection from the top-encapsulating layer of the tape. These direct reflections interfere with retro-reflected signals and add inaccuracies. The second source is the contrast with the disc border. Commonly used bordering material, such as plastic and anodized aluminum, may not reflect much visible light, but do reflect NIR (near infrared) light, which also add inaccuracies to the retro-reflected signal.

In some implementations, the markers may be substantially flat high-accuracy wipeable retro-reflective disc markers that include a number of layers. Such markers are highly resistant to contaminants while maintaining tracking accuracy by having a layered configuration.

In an aspect, a retro-reflective marker includes a bare retro-reflective layer, a protective layer with a near-infrared (NIR) wavelength specific anti-reflective coating, and a border with an NIR absorbent coating.

Implementations can include one or more of the following features.

In some implementations, the bare retro-reflective layer is a bottom layer of the marker, the NIR filter is a second layer of the marker, and the border with an NIR absorbent coating is a top layer of the marker.

In some implementations, the retro-reflective marker includes a base and a retaining ring that is configured to affix the base to maintain the bare retro-reflective layer, the NIR filter, and the border with an NIR absorbent coating in an assembled state.

In some implementations, the bare retro-reflective layer includes a plastic based reflective sheeting such as 3M™ 7610 material.

In some implementations, the NIR filter includes an NIR anti-reflective coating.

In some implementations, the NIR filter includes an anti-smudge coating.

In some implementations, the NIR filter is visibly opaque.

In some implementations, the NIR filter is an NIR transmitting optical filter with NIR wavelength specific anti-reflective coatings on top and bottom surfaces.

In some implementations, the NIR filter is made from an Astra™ NIR-75N 1.0 mm that is configured to transmit from 850 nm.

In some implementations, the border with the NIR absorbent coating is a donut-shaped bordering material that sets an aperture for the marker.

In some implementations, the border with the NIR absorbent coating in configured to suppress stray light.

In some implementations, the base is a mounting base that includes a threaded or snap-fit connection.

In some implementations, the retro-reflective marker is configured to be wipeable.

In some implementations, the retro-reflective marker is wipeable without negatively affecting the accuracy of the marker.

In some implementations, the retro-reflective marker is a target configured for use in an optical system.

The implementations described herein can provide various technical benefits. For instance, a marker can be provided that is both accurate and wipeable. For example, the marker can be a wipeable retro-reflective disc target that optimizes for optical navigation accuracy while maintaining high resistance to contaminants. This can be achieved by addressing the two sources of error that are typically present in conventional markers. For example, direct reflections are significantly reduced or eliminated by including an additional layer in the marker, and a bordering material having favorable retro-reflective properties is used.

The details of one or more embodiments are set forth in the accompanying drawings and the description below.

Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Described herein is a tracking system that is configured to determine a pose (e.g., position and orientation) of a tracked object in an environment using one or more markers. The tracked object generally includes such markers that are configured to provide signals to a tracking system that includes a sensor configured to measure the signals from the markers. The signals indicate pose of the tracked object in the environment based on the pose of each of the markers. For example, the tracking system can be an optical tracking system, and the markers can be passive markers configured to retro-reflect an optical signal from the tracked object. The passive markers can be retroreflective such that they are configured to reflect an optical signal along a parallel path back towards a source of the optical signal. Generally, an optical sensor (e.g., a camera) is positioned near the source of the optical signal and configured to detect the reflected optical signal from each of the markers. A retro-reflection (e.g., a glint) is detected for each marker. The tracking system is configured to estimate where the passive marker is in the environment based on where the retro-reflected signal is detected.

In some implementations, the markers are substantially flat high-accuracy wipeable retro-reflective disc markers that include a number of layers. Such markers are highly resistant to contaminants while maintaining tracking accuracy by having a layered configuration (e.g., three layers), as described in more detail below.

Figure 1:
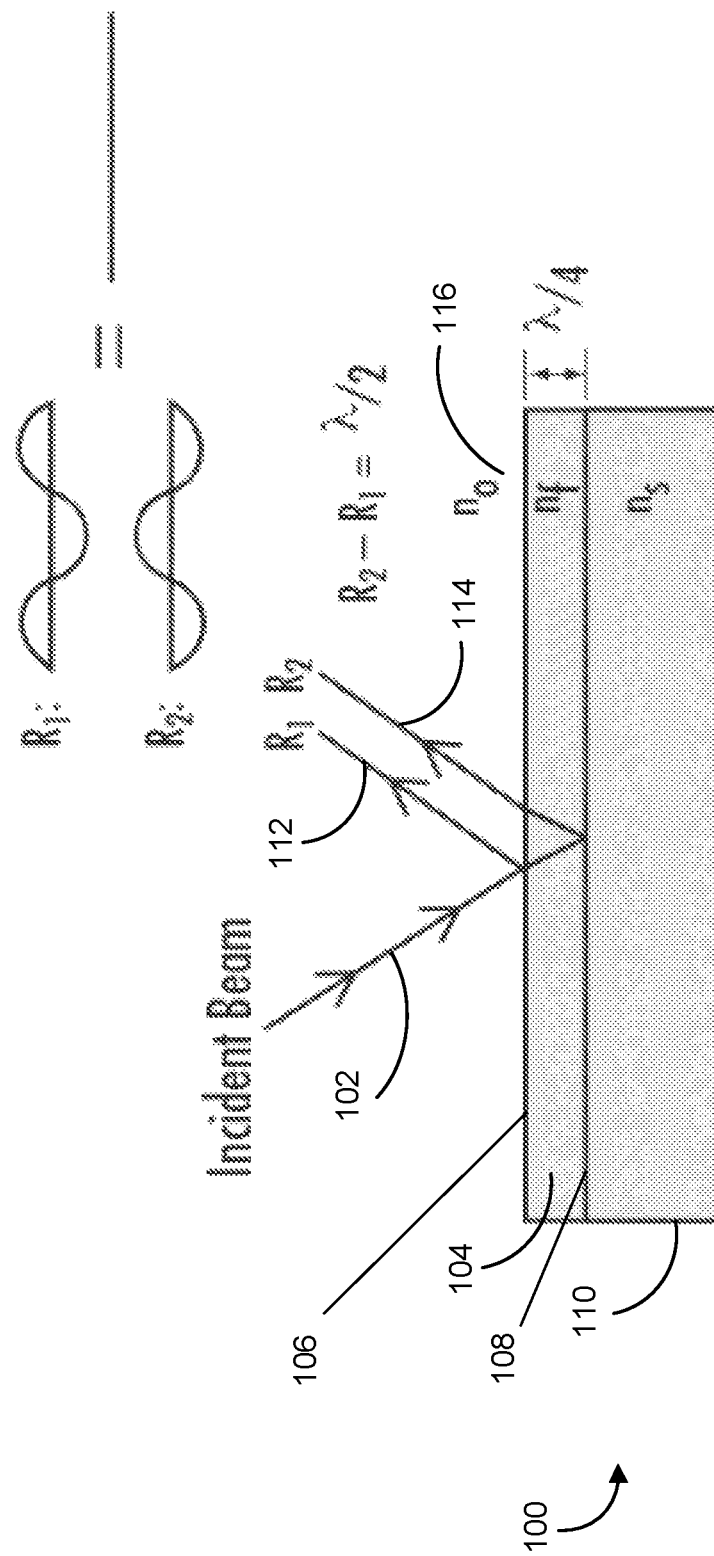
FIG. 1 shows an illustration of how a wavelength specific anti-reflective (AR) coating operates.

FIG. 1 shows an illustration of how a wavelength specific anti-reflective coating operates. Such an AR coating can be used to coat a layer (e.g., a middle layer) of the disk targets described herein (e.g., the marker 200 of FIG. 2) in order to reduce direct reflections of near-infrared (NIR) signals.

AR coatings are designed so that the relative phase shift between the incident beam 102 reflected at an upper boundary 106 and a lower boundary 108 of a film (nf) 104 that resides on a substrate ($n_s$) 110 is 180°. Destructive interference between the two reflected beams 112, 114 occurs, which cancels out both reflected beams 112, 114 before they exit the surface. In some implementations, the optical thickness of the film 104 is an odd integer multiple of $\lambda/4$, where $\lambda$, is a design wavelength or wavelength being optimized for peak performance in order to achieve the desired path difference of $\lambda/2$ between the reflected beams 112, 114. When achieved, cancellation of the beams results. An index of refraction of the film 104 needed for complete cancellation of the reflected beams 112, 114 can be found by using the refractive indices of the incident medium ($n_o$) and the substrate ($n_s$) 110, in which:

$$n_f = \sqrt{n_o n_s} \tag{1}$$

Two main sources of error exist for traditional disc target designs. One source is direct light reflection. The direct light reflection can occur at the outermost interface between free space and the outermost layer of the marker. These direct reflections interfere with retro-reflected signals and add inaccuracies. The second source of error experienced by conventional disc target designs is the contrast with the disc border (e.g., reflection irregularities that occur near the edge or border of the disc). The geometry of the edge, the type of material being used, etc. could cause reflection irregularities. Commonly used border materials, such as plastic and anodized aluminum, reflect NIR light and do not reflect visible light, which also adds inaccuracies to the retro-reflected signal.

Figure 2:
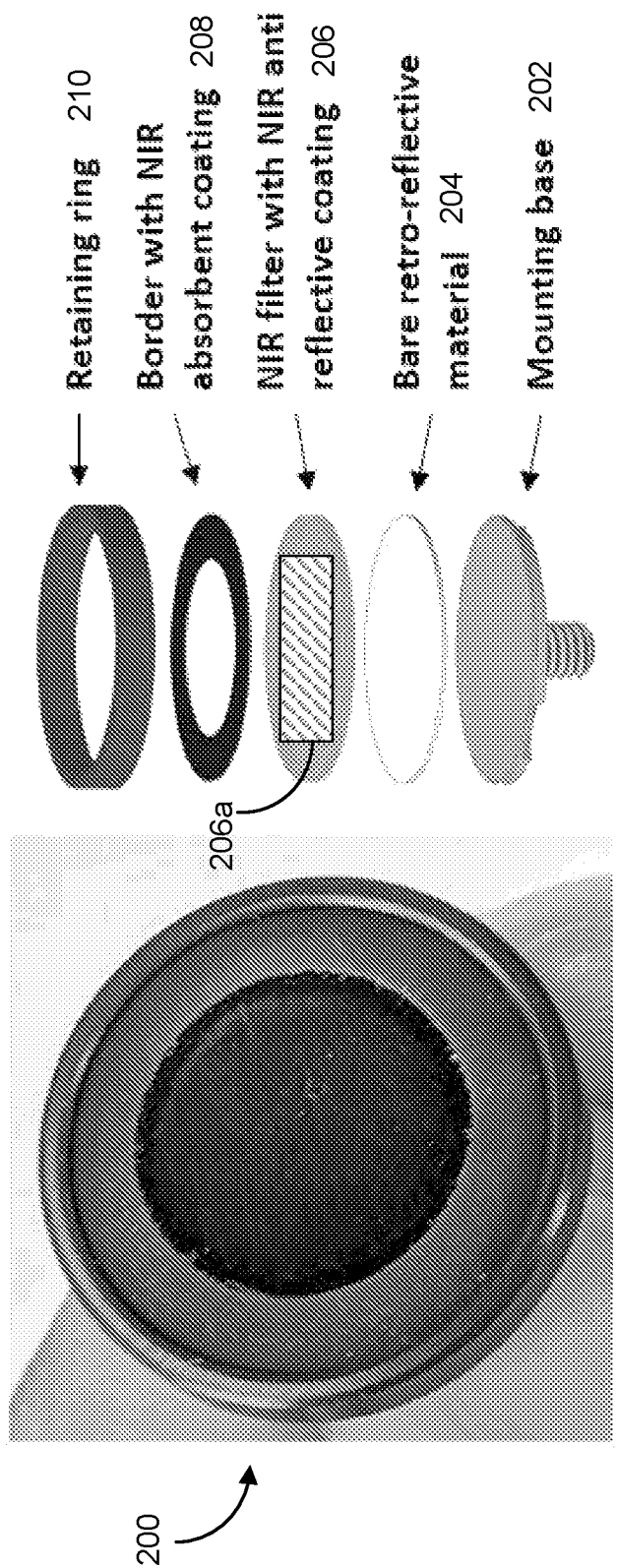
FIG. 2 shows an example of a wipeable retro-reflective disk target.

FIG. 2 shows an example of a multi-layered retro-reflective disk target 200. The retro-reflective disk target 200 is sometimes referred to herein as a retro-reflective marker 200, or simply a marker 200. The marker 200 includes a mounting base 202, a bare retro-reflective material 204 mounted to the base 202, a protective layer with an anti-reflective coating 206 mounted to the bare retro-reflective material 204, a border with an NIR absorbent coating 208 that surrounds the protective layer 206, and a retaining ring 210 that affixes to the mounting base 202 to maintain the layers 204, 206, 208 in an assembled state.

In some implementations, the bare retro-reflective material 204 (e.g., the bottom layer) may be made from a plastic based reflective sheeting, e.g., 3M™ 7610 material. The retro-reflective material 204 is bare in the sense that retroreflective beads are not encapsulated (e.g., they are exposed to air). This is in contrast to other available retroreflective materials which encapsulate the beads under a protective layer of their own.

In some implementations, the protective layer 206 can have a NIR anti-reflective coating and can be a NIR filter. In some implementations, the protective layer 206 (e.g., the middle layer) is visibly opaque, NIR transmitting optical filter with NIR wavelength specific anti-reflective coatings on top and bottom surfaces. In some implementations, the protective layer 206 may be made from an NIR filter such as an Astra™ NIR-75N 1.0 mm that is configured to transmit from 850 nm. In some implementations, the top surface of the protective layer 206 includes an anti-smudge coating 206a (e.g., in addition to the NIR anti-reflective coating).

In some implementations, the border with an NIR absorbent coating 208 (e.g., the top layer) is a donut-shaped bordering material that sets the aperture for the marker 200. The bordering material can be coated with NIR wavelength absorbing coating for suppressing stray light. In some implementations, the border has an NIR absorbent coating 208 and is made from a coated Polyimide film, e.g., an Acktar Maxiblack™ sheet.

The three layers of materials, from bottom to top, are assembled in a cylindrical case with a mechanical thread attachment along its center axis. In some implementations, the mounting base 202 and the retaining ring 210 are part of the cylindrical case. In some implementations, rather than being threaded, the cylindrical case may be configured for snap-fit attachment.

The multi-layered retro-reflective marker 200 is configured to be wipeable without negatively affecting the accuracy of the marker 200. The design of the marker 200 optimizes for optical navigation accuracy while maintaining high resistance to contaminants.

The types of direct reflections shown in FIG. 1 (e.g., using a traditional marker) can be significantly reduced or eliminated by using the multi-layered retro-reflective marker 200 of FIG. 2. In some cases, accuracy over conventional markers can be as much as 3 times.

Figures 3A, 3B:
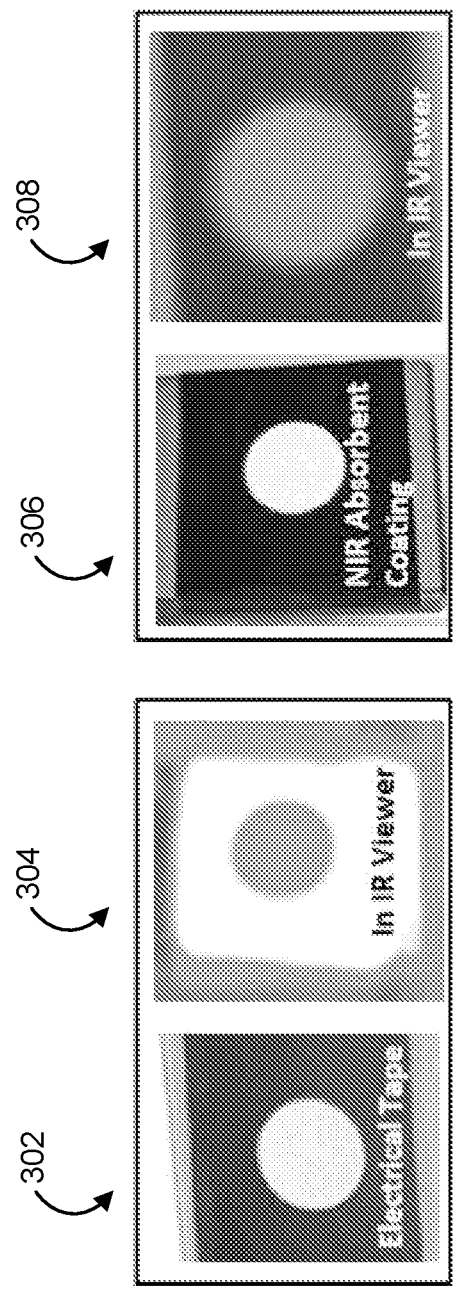
FIGS. 3A and 3B show examples of border setting materials.

FIGS. 3A and 3B show examples of different border setting materials being used for example markers 302, 306. FIG. 3A shows a first example marker 302 with a border made from black electrical tape. Contrast that with FIG. 3B, which shows a second example marker 306 with a border made from an NIR absorbent coating. The IR viewers of each 304, 308, respectively, show the results of a favorable border setting material (e.g., NIR absorbent border) versus an unfavorable border setting material (e.g., black electrical tape) around a bare retro-reflective disc.

In some implementations, the marker can have a diameter or about 6 mm-20 mm. In some implementations, the bare retro-reflective material 204 and the border with an NIR absorbent coating 208 can have thicknesses of less than about 0.5 mm. In some implementations, the NIR filter with NIR anti-reflective coating 206 can have a thickness of about less than 1 mm. In some implementations, the aperture of the border with an NIR absorbent coating 208 can have a diameter of about 4 mm-18 mm.

Figure 4:
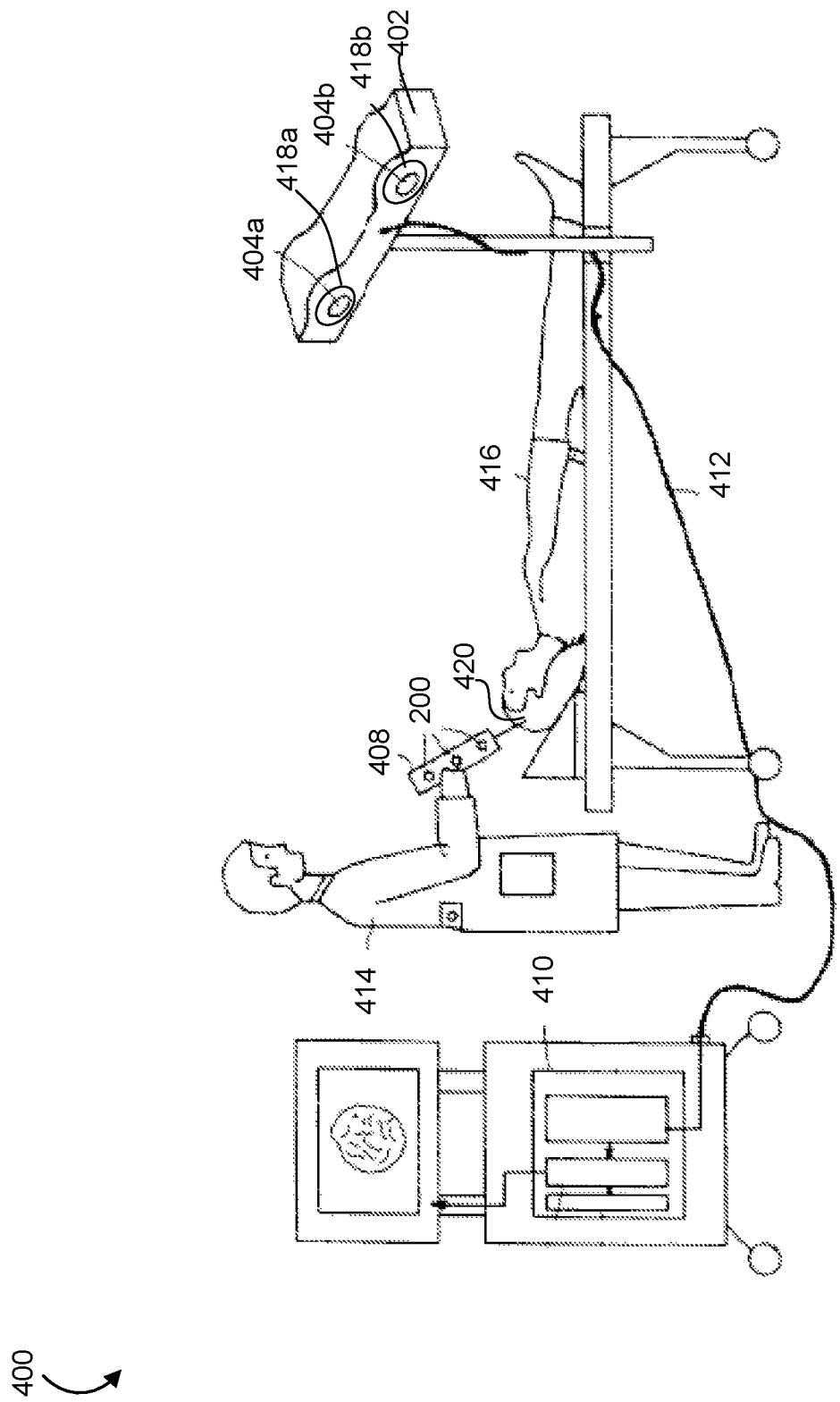
FIG. 4 shows an example tracking system that includes the wipeable retro-reflective disk target of FIG. 2.

FIG. 4 shows an example of a tracking system 400 (e.g., an optical tracking system) that includes plurality of disc targets (e.g., the wipeable retro-reflective disk target 200 of FIG. 2). The tracking system 400 includes an illumination/image capture unit 402 in which a marker sensing device (e.g., a camera, an array of cameras 404a-b, etc.) and marker illuminating device(s) 418a-b (e.g., electromagnetic waves source) that are rigidly mounted. In this example, the illuminating devices 418a-b emit electromagnetic waves, such as visible light, infrared light, etc. The electromagnetic waves are directed at a region that includes the one or more disk targets 200 that are affixed to an object 408. In the context shown in FIG. 1, the object 408 can be a tool (e.g., a surgical tool, medical device for treating a patient, etc.). The object is sometimes referred to as a tracked object. The disc targets 200 are configured to have retro-reflectivity to reflect incoming electromagnetic waves in a parallel and opposite direction from the incoming direction. The cameras 404a-b capture one or more images of the illuminated disk targets 200. Due to the highly retro-reflective nature of the disk targets 200, each target appears as a relatively bright spot in the captured images, and the system can determine the spatial coordinates (e.g., Cartesian, spherical, cylindrical, etc.) and an intensity value that represents, for example, the brightness of each corresponding spot. This data is provided to a computing device (e.g., a processor) of a computing system 410. The computing device is configured to determine where in the region or environment the disk targets 200 are located with respect to the cameras 404a-b.

Generally, the computing device is part of the computer system 410 that is connected to the array of cameras 404a-b via communication links 412 (e.g., wired communication links or wireless communication links). In some examples, the computing system is located within the camera mounting unit 402. The computing system 410 may include one or more of various forms of digital computers, including, e.g., laptops, desktops, workstations, personal digital assistants, servers, blade servers, mainframes, and other appropriate computers. The computing system 410 may include one or more of various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed herein.

Given the known locations of the cameras 404a-b included in the array and the locations of the disk targets 200, the computing device can calculate a position and/or orientation of the object 408. Further, on the basis of the known relationship between the location of each of the disk targets 200 and the location of a tip 420 of the object 408 in the working volume (e.g., a tool coordinate system), the computing device can calculate the coordinates of the tool tip 420 in space. In those instances in which the object 408 is handled by a user (e.g., a surgeon 414) and the tool tip 420 is pressed against or is otherwise in contact with a surface (e.g., a body 416 of a patient), the coordinates of the tool tip 420 correspond to the coordinates of the point at which the tool tip 420 contacts the surface.

A number of implementations of the subject matter have been described. Nevertheless, it will be understood that various modifications may be made without departing from the spirit and scope of the subject matter disclosed herein. For example, the position of disk targets and tracked object can change with time. The computing device may be configured to automatically detect which bright spots in an image identified as disk target retro-reflections at a first time and at first positions correspond to marker retro-reflections that are identified at a second time and at second positions. Accordingly, other implementations are within the scope of the following claims.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, tracking system 400 and the computing system 410 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. For example, a computing system (such as computing system 410) can be used in the tracking system to control operation of the emitter and to process the images captured by the image sensor. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, computing system 410 includes a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 5:
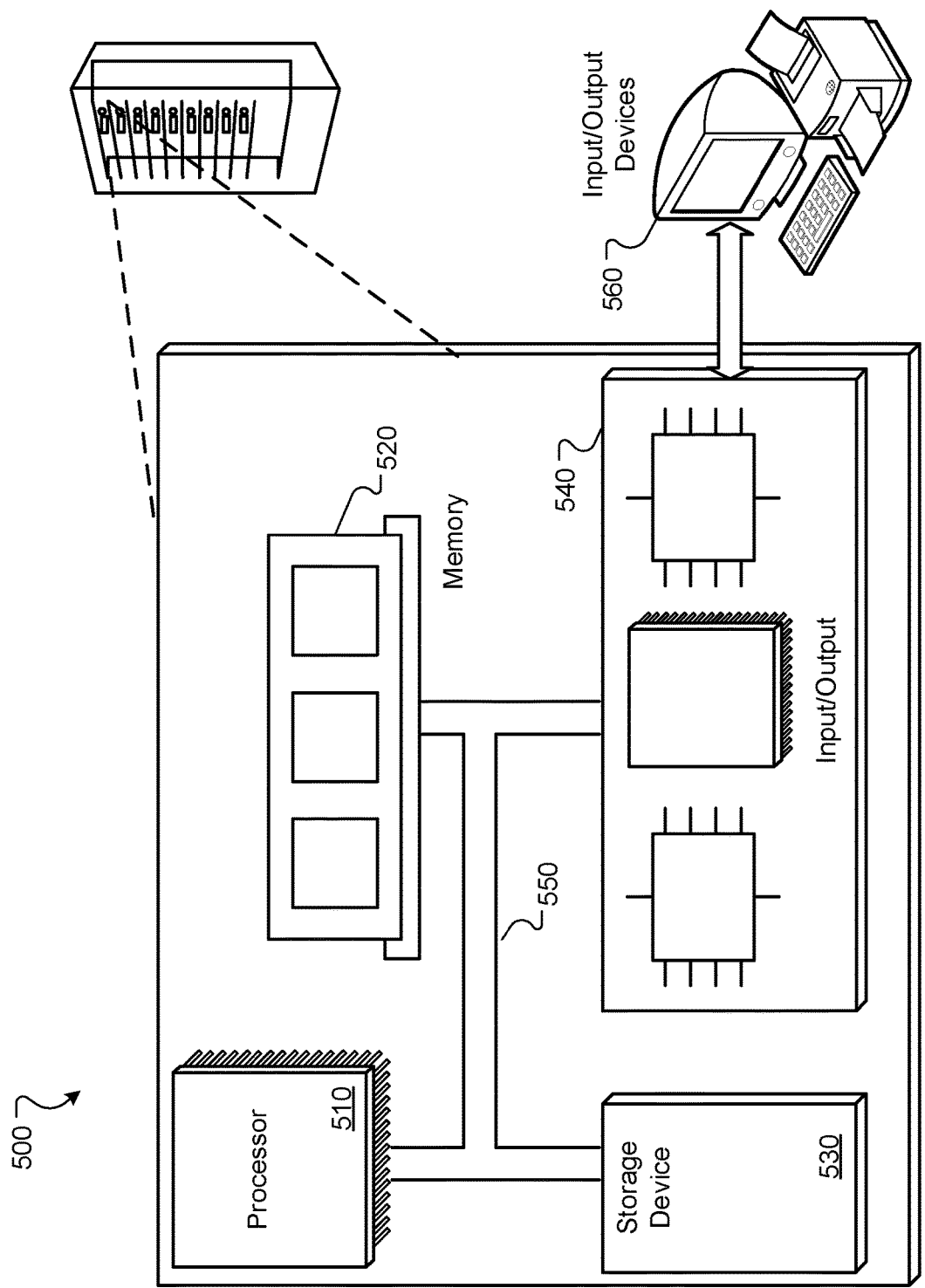
FIG. 5 shows a diagram of an example computing system.

FIG. 5 shows an example computer system 500 (e.g., similar to or including computing system 410) that includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface device, e.g., an Ethernet card, a serial communication device, e.g., an RS-232 port, and/or a wireless interface device, e.g., an 802.11 card, a 3G wireless modem, a 4G wireless modem, a 8G wireless modem, etc. In some implementations, the input/output device can include driver devices configured to receive input data and send output data to other input/output devices, e.g., keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Thus, specific embodiments of the optical tracking system and retro-reflective markers and methods for using the optical tracking system to track retro-reflective markers have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Where a range of values is provided, it is understood that each intervening value, to the tenth of the unit of the lower limit unless the context clearly dictates otherwise, between the upper and lower limit of that range and any other stated or intervening value in that stated range is encompassed within the subject matter disclosed herein. The upper and lower limits of these smaller ranges may independently be included in the smaller ranges is also encompassed within the subject matter disclosed herein, subject to any specifically excluded limit in the stated range. Where the stated range includes one or both of the limits, ranges excluding either or both of those included limits are also included in the subject matter disclosed herein.

Unless defined otherwise, all technical and scientific terms used herein have the same meaning as commonly understood by one of ordinary skill in the art to which this subject matter belongs. Although any methods and materials similar or equivalent to those described herein can also be used in the practice or testing of the present subject matter, a limited number of the exemplary methods and materials are described herein.

What is claimed is:

1. A retro-reflective marker comprising:
   a retro-reflective layer comprising retro-reflective beads, wherein the retro-reflective beads are exposed to air;
   a near-infrared (NIR) filter with an NIR wavelength specific anti-reflective coating; and
   a border having an NIR absorbent coating, the border covering a portion of the NIR filter and defining an aperture for the retro-reflective marker.

2. The retro-reflective marker of claim 1, wherein the retro-reflective layer is a bottom layer of the marker, the NIR filter with the NIR wavelength specific anti-reflective coating is a second layer of the marker, and the border with the NIR absorbent coating is a top layer of the marker.

3. The retro-reflective marker of claim 1, wherein the retro-reflective layer comprises a plastic based reflective sheeting.

4. The retro-reflective marker of claim 1, wherein the NIR filter includes an anti-smudge coating.

5. The retro-reflective marker of claim 1, wherein the border with the NIR absorbent coating is configured to suppress stray light.

6. The retro-reflective marker of claim 1, wherein the retro-reflective marker is a target configured for use in an optical system.

7. The retro-reflective marker of claim 1, further comprising a base and a retaining ring that is configured to affix the base to maintain the retro-reflective layer, the NIR filter, and the border with an NIR absorbent coating in an assembled state.

8. The retro-reflective marker of claim 7, wherein the base is a mounting base that includes a threaded or snap-fit connection.

9. The retro-reflective marker claim 1, wherein the NIR filter is an NIR transmitting optical filter, and wherein the NIR wavelength specific anti-reflective coating is positioned on a top surface of the NIR filter and a bottom surface of the NIR filter.

10. The retro-reflective marker of claim 9, wherein the NIR filter is configured to transmit wavelengths greater than 850 nm.

11. The retro-reflective marker of claim 1, wherein the retro-reflective marker is configured to be wipeable.

12. The retro-reflective marker of claim 11, wherein the retro-reflective marker is wipeable without negatively affecting accuracy of the marker.

13. A retro-reflective marker comprising:
    a retro-reflective layer comprising retro-reflective beads, wherein the retro-reflective beads are exposed to air;
    a visibly opaque protective layer with a near-infrared (NIR) wavelength specific anti-reflective coating; and
    a border having an NIR absorbent coating, the border covering a portion of the protective layer and defining an aperture for the retro-reflective marker.

14. The retro-reflective marker of claim 13, wherein the retro-reflective layer is a bottom layer of the marker, the protective layer with the NIR wavelength specific anti-reflective coating is a second layer of the marker, and the border with the NIR absorbent coating is a top layer of the marker.

15. The retro-reflective marker of claim 13, wherein the retro-reflective layer comprises a plastic based reflective sheeting.

16. The retro-reflective marker of claim 13, wherein the retro-reflective marker is configured to be wipeable.

17. The retro-reflective marker of claim 13, further comprising a base and a retaining ring that is configured to affix the base to maintain the retro-reflective layer, the protective layer, and the border with an NIR absorbent coating in an assembled state.

18. The retro-reflective marker of claim 17, wherein the base is a mounting base that includes a threaded or snap-fit connection.

19. A retro-reflective marker comprising:
    a retro-reflective layer comprising retro-reflective beads, wherein the retro-reflective beads are exposed to air;
    a protective layer with a near-infrared (NIR) wavelength specific anti-reflective coating; and
    a border having a ring shaped geometry and comprising an NIR absorbent polyimide film, the border covering a portion of the protective layer and defining an aperture for the retro-reflective marker.

20. The retro-reflective marker of claim 19, wherein the retro-reflective layer is a bottom layer of the marker, the protective layer with the NIR wavelength specific anti-reflective coating is a second layer of the marker, and the border with the NIR absorbent coating is a top layer of the marker.

21. The retro-reflective marker of claim 19, wherein the retro-reflective layer comprises a plastic based reflective sheeting.

22. The retro-reflective marker of claim 19, wherein the retro-reflective marker is configured to be wipeable.

23. The retro-reflective marker of claim 19, further comprising a base and a retaining ring that is configured to affix the base to maintain the retro-reflective layer, the protective layer, and the border with an NIR absorbent coating in an assembled state.

24. The retro-reflective marker of claim 23, wherein the base is a mounting base that includes a threaded or snap-fit connection.

25. A marker comprising:
a cylindrical mounting base;
a retro-reflective layer adjacent to the cylindrical mounting base and comprising retro-reflective beads, wherein the retro-reflective beads are exposed to air;
a visibly opaque protective layer configured to provide a near-infrared (NIR) filter above the retro-reflective layer;
a NIR anti-reflective coating adjacent to a top surface of the visibly opaque protective layer and adjacent to a bottom surface of the visibly opaque protective layer, the NIR anti-reflective coating being operable to provide destructive interference of incident waves,
an anti-smudge coating adjacent to the NIR anti-reflective coating adjacent to the top surface of the visibly opaque protective layer;
a border having a ring shaped geometry and comprising an NIR absorbent film, the ring shaped geometry defining an aperture for the marker; and
a retaining ring configured to maintain relative positioning of the retro-reflective layer, the visibly opaque protective layer, the retaining ring mounting to the cylindrical mounting base.

26. The marker of claim 25, wherein the NIR absorbent film comprises polyimide.

27. The marker of claim 25, wherein the retaining ring comprises a threaded or snap-fit connection to mount the retaining ring to the cylindrical mounting base.

\* \* \* \* \*